K. T. SPENCER AND L. G. WILLS.
TRANSMISSION GEAR PROVIDING AUTOMATIC COMPENSATION FOR VARIATIONS IN THE SPEED AND POWER TRANSMITTED.
APPLICATION FILED NOV. 22, 1920.
1,384,357.
Patented July 12, 1921.
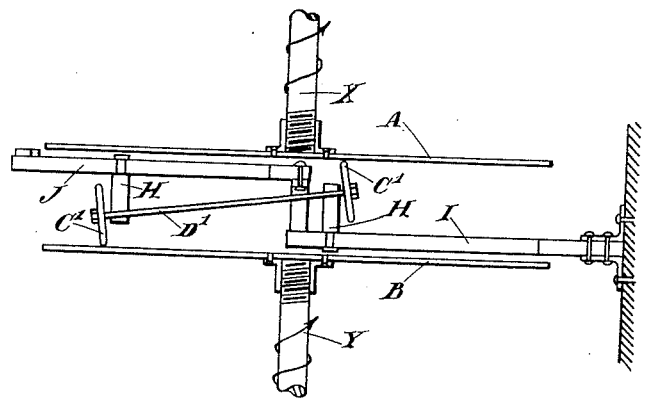
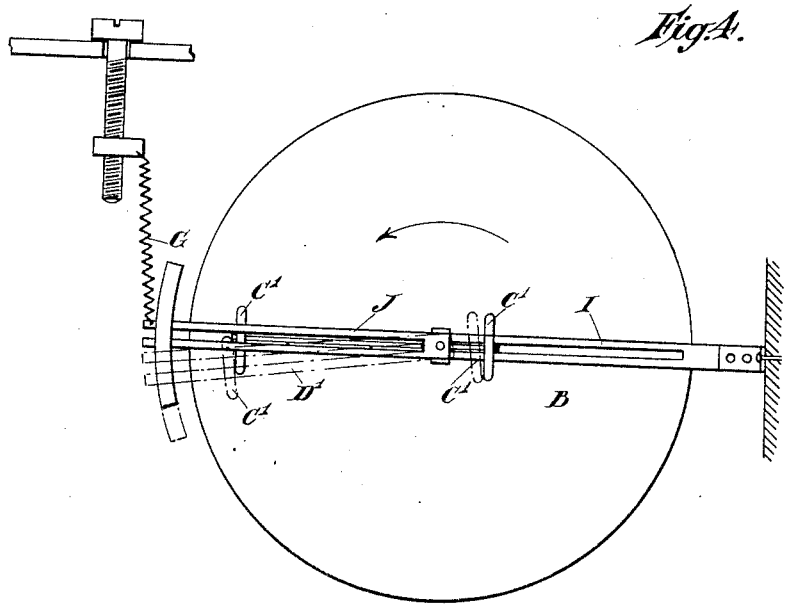
INVENTORS
KELVIN T. SPENCER
LEONARD G. WILLS

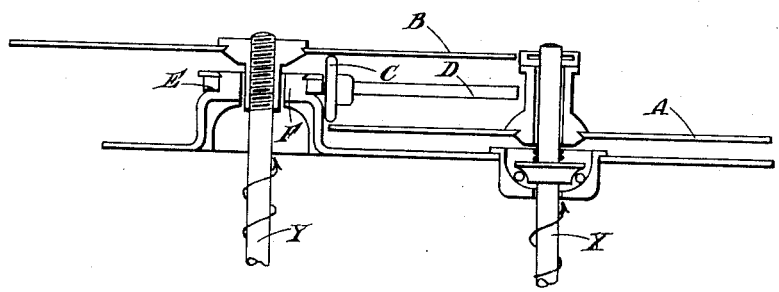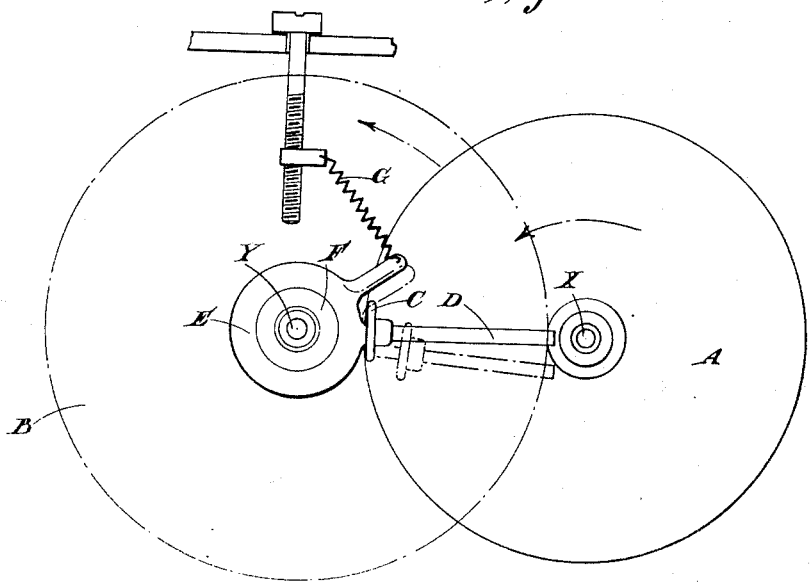

UNITED STATES PATENT OFFICE.

KELVIN TALLENT SPENCER, OF HARMONDSWORTH, AND LEONARD GOODWYN WILLS, OF LONDON, ENGLAND.

TRANSMISSION-GEAR PROVIDING AUTOMATIC COMPENSATION FOR VARIATIONS IN THE SPEED AND POWER TRANSMITTED.

1,384,357.             Specification of Letters Patent.     Patented July 12, 1921.

Application filed November 22, 1920. Serial No. 425,875.

*To all whom it may concern:*

Be it known that we, KELVIN TALLENT SPENCER and LEONARD GOODWYN WILLS, both subjects of the King of Great Britain and Ireland, and residents, respectively, of Harmondsworth, county of Middlesex, and London, county of London, England, have invented a certain new and useful Improvement in Transmission-Gear Providing Automatic Compensation for Variations in the Speed and Power Transmitted, of which the following is a specification.

This invention relates to improvements in transmission gear providing automatic compensation for variations in the speed and power transmitted, and has for its principal objects (1) to keep constant the torque on a driven shaft for varying speeds of the driving shaft; and (2) to keep constant the torque on the driving shaft for varying powers taken from the driven shaft.

The invention belongs to that class of apparatus in which a friction disk on one shaft is arranged to drive a friction disk on another shaft through the motion of a third disk or idler between the two friction disks, but we make an improved idler mechanism in two different forms, one form being used when the driving and driven shafts are parallel, and the other form for use when the two shafts are in the same straight line. With each form we combine a spring control mechanism, whereby the position of the idler is moved with respect to the friction disks and the gear ratio of the two disks is automatically varied according to the condition.

In the first form, illustrated by elevation and plan respectively in Figures 1 and 2 of the accompanying drawings, applied, for example, to a case wherein two parallel shafts X and Y have each a friction disk A and B respectively at the end, one disk partially overlapping the other, the idler C is slidably mounted on a spindle D radially disposed between the overlapping halves of the two disks, and is free to move longitudinally along this spindle which is free at one end and rigidly attached at the other end to a ring E capable of moving through an angle around a collar F arranged concentrically with the driven shaft Y. The angular movement of the ring and spindle is controlled by a spring G which is fixed at one end and attached at the other end to an arm on the ring E, and which in the normal position of equilibrium would maintain the spindle radial to both friction disks.

When power is being transmitted from the driving disk A to the driven disk B, there will be a force on the idler tending to make it move bodily in the direction (shown by arrows in the figures) in which the driving disk is revolving. This force will be transmitted from the idler to its spindle and so to the spring, the moment of the force about the axis of the driven shaft being balanced by the spring acting on the arm on the ring. The spindle is then radial to both disks; there is no longitudinal movement of the idler on the spindle and the gear ratio remains constant.

If the speed of the driving disk A should increase, tending to increase the torque on the driven disk B, the force on the idler and the moment about the axis of the driven shaft Y will also increase and will cause the spring to stretch and the idler spindle will move through a small angle, to the position shown in dotted lines in Fig. 2, for example, and be no longer radial to the driving disk. The idler will therefore roll inward toward the driving shaft X and outward toward the periphery of the driven disk B, reducing the speed of the latter until the torque on it is restored to its original value, when the spring will once more be able to maintain the idler spindle in its normal position.

Similarly, if the speed of the driving disk A should decrease, the idler will be urged toward the periphery of the driving disk A and nearer to the driven shaft Y, increasing the speed of the latter and maintaining a constant torque about its axis.

Fig. 3 is an elevation and Fig. 4 is a plan showing the second form of idler mechanism which is used, for example, when the axes of the driving and driven shafts are in the same straight line and the two friction disks are parallel and near to one another, and in which two idlers C' are used connected by, and keyed to, a spindle D' of suitable length inclined at an angle between the friction disks, each idler bearing against one of the disks. The idler spindle is mounted in two bearings H, each capable of turning and sliding in a groove or slot in a bar. One bar I is fixed and the other bar J is capable of rotation through an angle concentric with the axis of the friction disks and its movement is controlled by the spring G. In the position of equilibrium, the two slotted bars are in the same plane or in parallelism, the spindle of the two idlers being radial to the disks, but when any change takes place, such as an increase or decrease in the speed of the driving disk, the idler spindle will be moved from the radial position one way or the other and the idlers will be moved, with their bearings sliding in the slotted bars, over the surfaces of the disks until a position of equilibrium is again reached, such as is shown in dotted lines in Fig. 4, assuming that an increase of speed of the driving disk A has occurred.

Our invention has been hereinbefore described as applied to shafts which are parallel or in the same straight line, but both forms of idler mechanism may be used with shafts which are inclined to one another, or combinations of both forms may be used when the angle between the driving and driven shafts is 90 degrees or approaching 90 degrees.

We claim:—

1. In transmission gearing, the combination with the driving and driven shafts having disks thereon, of a spring tensioned frame mounted to swing on an axis coincident with the axis of the driven shaft, and a transmission element slidably carried on said frame and contacting with said disks.

2. In transmission gearing, the combination with driving and driven shafts having disks thereon, of a frame mounted to swing on an axis coincident with the axis of the driven shaft, and an idler wheel slidably carried by said frame and contacting with said disks.

3. In transmission gearing, the combination with driving and driven shafts having disks thereon, of a frame including a ring and a projecting arm, an idler wheel mounted to slide freely on said arm and contacting with said disks, means for supporting the ring of the frame concentric with one of the said shafts, and a spring connected with said ring for placing the ring and arm under tension.

4. In transmission gearing the combination with driving and driven shafts having disks thereon, of a spindle which is free at one end and rigidly attached at the other end to a spring controlled ring capable of angular movement around a collar arranged concentrically with the driven shaft, and an idler disk slidably mounted upon said spindle and engaging said disks.

5. In transmission gearing, the combination with the driving and driven shafts having disks thereon, of a frame mounted to swing on an axis coincident with the axis of one of said shafts, and a transmission element slidably carried on said frame and contacting with said disks.

6. In transmission gearing, the combination with the driving and driven shafts having disks thereon, of a frame mounted to swing on an axis coincident with the axis of one of the shafts, an idler roller carried by said frame for angular and longitudinal adjustment with respect to the said disks, and a spring connected with said frame whereby the gear ratio of the driving disk to the driven disk is automatically increased or decreased respectively in the driving speed and torque.

In testimony whereof we have hereunto set our hands this 23d day of October, 1920.

KELVIN TALLENT SPENCER.
LEONARD GOODWYN WILLS.